United States Patent
Brito Lopes et al.

(10) Patent No.: US 7,708,918 B2
(45) Date of Patent: May 4, 2010

(54) PRODUCTION PROCESS OF PLASTIC PARTS BY REACTION INJECTION MOULDING, AND RELATED HEAD DEVICE

(75) Inventors: José Carlos Brito Lopes, Oporto (PT); Ricardo Jorge Nogueira Dos Santos, Oporto (PT); André Fernando Tato Macedo Teixeira, Oporto (PT); Mário Rui Pinto Ferreira Nunes Costa, Oporto (PT)

(73) Assignee: Faculdade de Engenharia da Universidade do Porto, Porto (PT)

( * ) Notice: Subject to any disclaimer, the term of this patent is extended or adjusted under 35 U.S.C. 154(b) by 277 days.

(21) Appl. No.: 10/594,070

(22) PCT Filed: Apr. 5, 2005

(86) PCT No.: PCT/IB2005/000886

§ 371 (c)(1),
(2), (4) Date: Nov. 27, 2007

(87) PCT Pub. No.: WO2005/097477

PCT Pub. Date: Oct. 20, 2005

(65) Prior Publication Data

US 2008/0206392 A1    Aug. 28, 2008

(30) Foreign Application Priority Data

Apr. 5, 2004    (PT) .................................... 103101

(51) Int. Cl.
B29C 45/76    (2006.01)

(52) U.S. Cl. ...................................... 264/40.1; 425/546
(58) Field of Classification Search ................. 264/406, 264/407, 443, 40.1
See application file for complete search history.

(56) References Cited

U.S. PATENT DOCUMENTS 3,390,692 A * 7/1968 Hastie et al. ................. 137/828
3,913,892 A   10/1975 Ersfeld et al.
4,090,695 A   5/1978  Stone et al.

(Continued)

FOREIGN PATENT DOCUMENTS

EP    0 080 698 A    6/1983

(Continued)

*Primary Examiner*—Khanh Nguyen
*Assistant Examiner*—Margaret Brodie
(74) *Attorney, Agent, or Firm*—Sughrue Mion, PLLC

(57) ABSTRACT

The present invention relates to a process and device RIM involving a mixing chamber (1) with opposing injectors (2, 3). The efficiency is maximized through the operation in flow regimes with very strong mixing dynamics, which is assured by means of the introduction of schemes to: detect the flow regime within the mixing chamber, through the dynamic pressure measurement upstream of the injectors (2, 3), using means (5); and/or impose a chaotic flow regime, through the pulsation of the opposed jets, using means (6). Alterations in design, comparatively to the traditional geometries, are also proposed, concerning: the mixing chamber (1), being foreseen a prismatic rectangular chamber; the injectors (2, 3), being foreseen elongated injectors; and even the scheme of injection of the materials, using a third injector (4).

5 Claims, 1 Drawing Sheet

U.S. PATENT DOCUMENTS

| | | | |
|---|---|---|---|
| 4,399,104 A | | 8/1983 | Coblenz et al. |
| 4,721,602 A | | 1/1988 | Woitzel et al. |
| 4,944,599 A | * | 7/1990 | Soechtig .................... 366/132 |
| 5,002,475 A | * | 3/1991 | Graefe ....................... 425/135 |
| 5,060,522 A | | 10/1991 | Lew et al. |
| 2002/0060379 A1 | * | 5/2002 | Wei et al. .................... 264/443 |
| 2003/0075821 A1 | | 4/2003 | Zimmet et al. |
| 2004/0130049 A1 | * | 7/2004 | Begemann et al. ......... 264/40.1 |
| 2005/0056313 A1 | * | 3/2005 | Hagen et al. ................... 137/3 |

FOREIGN PATENT DOCUMENTS

| | | |
|---|---|---|
| EP | 0 257 221 A | 3/1988 |
| EP | 0 260 564 A | 3/1988 |
| EP | 1 088 648 A | 4/2001 |

* cited by examiner

FIG. 1
FIG. 2
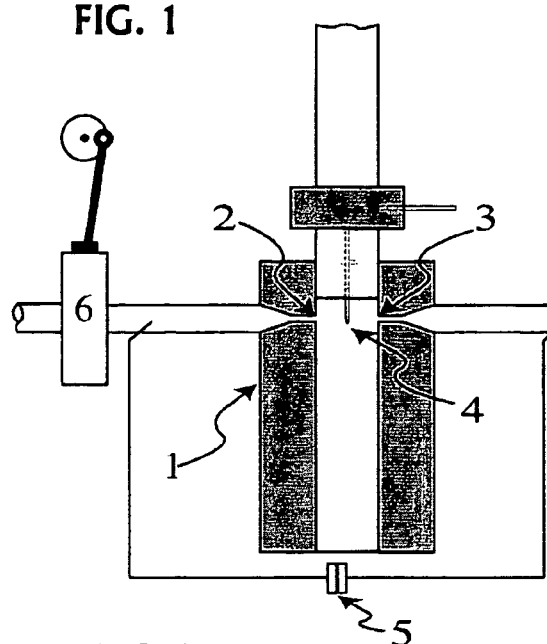
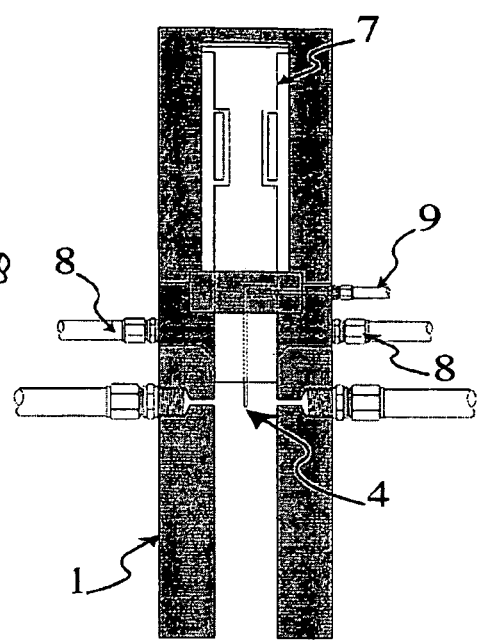
FIG. 3
FIG. 4
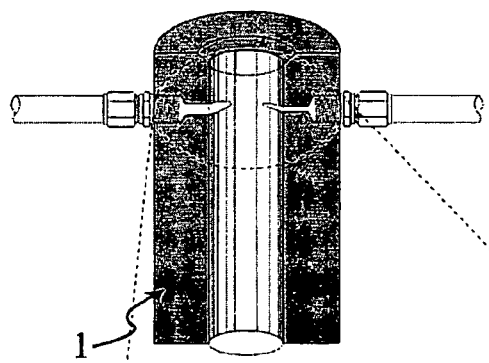
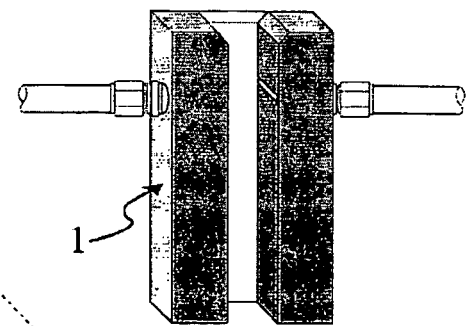
FIG. 5
FIG. 6
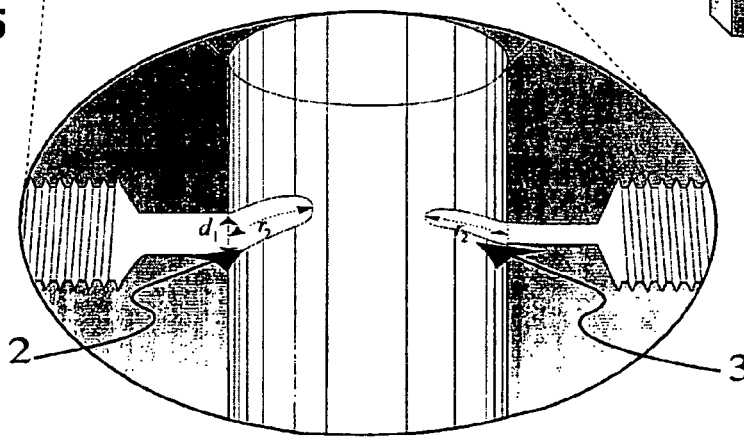
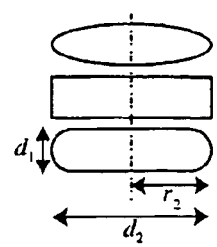

PRODUCTION PROCESS OF PLASTIC PARTS BY REACTION INJECTION MOULDING, AND RELATED HEAD DEVICE

TECHNICAL FIELD/APPLICATIONS

The present invention concerns a process for the production of plastic parts by Reaction Injection Moulding (referred herein as RIM), as well as the respective equipment for production of plastic parts by moulding, using fast kinetics polymerization reactions (polyurethanes, polyureas, silicone, polyamides, polyesters, vinyl and acrylic polymers—see Macosko and Lee (1978)). This equipment mixes the monomers, catalysts, initiators, solvents and additives, which initiate the polymerization reaction, which are then injected in the mould. The scope of this invention is the increase of the quality and degree of mixing of the initial streams before they are injected in the mould.

The increase of the quality and mixing extent of the mixture, by means of the alterations proposed in this patent, allows the extension of the range of applications of this technique to the following fields:

production of optical quality plastics with application to areas as diverse as medicine and the automobile industry;

polymerization processes that require mixing of components with very different flowrates, as in the case of the initiator and monomer for anionic polymerizations (see Vuillemin and Nowe (1996) and Vuillemin and Nowe (1999)).

The application of the present invention is not restricted to RIM machines, but it includes any and all types of jet mixer/reactor that adopts any of the techniques here proposed with the objective of increasing the degree and quality of mixing.

STATE OF THE ART

The RIM process, as it is used in the production of polyurethanes and other polymers, is well established and widely applied, but still nowadays its underlying mixing mechanisms are not well known. Since the core of this process is the injection of two opposing jets with velocity in the range of 10 to 100 m/s, in cylindrical chambers with characteristic diameter of 10 mm, it presents enormous difficulties to the understanding and knowledge of its mixing mechanisms. Despite this fact, it is well known that the mixture affects in a critical way the properties of the polymers produced with the RIM process (Kolodziej, et al. (1982) and Kolodziej, et al. (1986)). In the RIM process, poor mixing conditions induce the occurrence of undesired phenomena such as wet points, due to non-polymerized fractions of monomer and heterogeneities in the physical properties of the polymer.

A know fact about this process is the possibility of the existence of two distinct flow regimes in the mixing chamber (Teixeira (2000) and Santos (2003)):

A regime where the mixture of the two separately injected monomers is virtually non-existent, characterized by a stationery flow.

A chaotic flow regime, where the formation of vortices promotes the mixing of the reactants and strong oscillations in the jets.

The above-mentioned mixing problems in this process arise from the potentially undesirable operation of the reactor in the stationary flow regime, even if for very short periods.

About the operating and design conditions that lead to the achievement of chaotic flow regimes, the only known and well-established fact is that for fluids with viscosities above 20 mPa.s and if the kinetic energy ratio between the two jets is equal to unity, the transition between the two regimes occurs at a critical Reynolds number of 120 (Santos (2003)). Here the Reynolds number is based on the velocity in the injectors and defined as:

$$Re = \frac{\rho v_{inj} d}{\mu}$$

where $\rho$ and $\mu$ are respectively the density and viscosity of the fluid, d is the hydraulic diameter and $v_{inj}$ is the superficial velocity in the injectors. It has been shown experimentally that, even for Reynolds numbers above the critical value, stationary flow may occur for short periods.

Due to the lack of knowledge about the mixing mechanisms and the conditions that favour mixing in the RIM process, the design of its mixing chambers is mostly based on the designer's experience and/or a trial-and-error approach. Some alterations to improve mixing in RIM machines have been proposed: the use of obstacles within the mixing chamber (see for example, Wallner (1987) and Wallner (1988)); orientation of the jets (see Macosko and McIntyre (1984), Decker (1993) and Nenncker (1996)); increase in jet turbulence by the introduction of a perforated plate at the exit of the injectors (Reilly and Michels (1989); geometrical configurations for specific chemical systems such as polyurethanes (see Schulte, et al. (2001)).

Research studies in the last 10 years at Faculdade de Engenharia da Universidade do Porto (Teixeira (2000) and Santos (2003)), using the most advanced techniques for flow characterization, enabled the knowledge of both the hydrodynamics within this reactor and the effect of various parameters. This work has shown that it is possible to achieve a highly homogeneous mixture of the reactive monomers in this process, in a chamber with no obstacles and using opposing jets. In particular, it was shown that it is the mechanism of formation of vortices that determines the value of natural oscillation frequency of the jets (see Santos (2003)). It was also verified that bad mixing in this process mostly results from deficient operating conditions.

The conclusions of the hydrodynamic studies underlie the present invention. However the specific characteristics of the invention could only be determined afterwards by searching for specific means and procedures aiming at the actual application in an industrial environment, as well as by performing the correspondent simulations and tests. This is the case, not only for the characteristics of the device according to the invention, namely the geometrical configuration of the mixing chamber and/or of the injectors, but also in terms of the process operation. In any case, the characteristics of the invention aim to guarantee that the devices or equipments, namely RIM devices, and jets mixing/reaction processes, namely RIM processes, operate in flow regimes with very high mixing efficiency.

DESCRIPTION OF THE INVENTION

In the present invention, the resolution of the technical problem (increase of mixing efficiency, both in degree and in homogeneity) is achieved by way of: the assessment of the pulsation by dynamical pressure measurements; and/or the introduction of an artificial flow pulsation, which combines with the natural chaotic flow pulsation. These assessment and/or introduction occur preferentially upstream of the injectors.

According to the invention, besides the specific embodiments of the process in which it is only used one of the two related operating modes, there is a further embodiment in which both modes are used simultaneously, as well as another embodiment where the introduced artificial pulsation is adjusted—in frequency and/or in amplitude—by automated means, as a function of the dynamic pressure measurements.

Preferential embodiments foresee the use of differential pressure transducers for the dynamic pressure measurements, and the use of multiple or sub-multiple frequencies of the flow natural frequency for the artificially introduced pulsation.

The present invention also focus on a device or equipment for the implementation of the previously described process, where, it is specifically considered, besides the mixing and reaction chamber with at least two opposing injectors, sensors for dynamic pressure measurement and/or means for the introduction of specific frequencies and amplitudes to the jets of the injectors. These means may have as an input the results of the dynamic pressure measurement, to automatically obtain the adjustment of the flow regime.

Likewise, are also foreseen specific configurations of the chamber and/or of the injectors, namely in the shape, number and/or positioning of the injectors. A configuration is considered where the two opposing injectors are associated with an additional injector.

Prismatic chambers and rectangular injectors, as well as cylindrical chambers and injectors elongated in a direction transversal to the chamber axis, are examples of preferential configurations of this invention.

BRIEF DESCRIPTION OF THE DRAWINGS

The enclosed figures, presented as mere non-limitative examples, illustrate the device and process upon reference, based on some of the embodiments referred above. Thus:

FIG. 1: Schematic representation of a mixing chamber in a RIM device including: a mixing and reaction chamber; two opposing jet injectors; a third injector; a pressure transducer; two jet pulsating devices.

FIG. 2: Schematic representation of a mixing chamber in a RIM device including: cleaning piston; recirculation circuit; and a third injector and respective feeding circuit.

FIG. 3: A cylindrical mixing chamber with elongated injectors.

FIG. 4: A rectangular prismatic mixing chamber.

FIG. 5: Enlarged detail of a cylindrical mixing chamber in the opposing injectors region.

FIG. 6: Schematic representations of some possible geometries for elongated injectors.

DETAILED DESCRIPTION OF THE INVENTION

Hereinafter, a detailed description of the invention is presented, based on the above figures where the various elements referred in them are:

1—mixing and reaction chamber;
2,3—opposing injectors;
4—third injector;
5—pressure transducer;
6—pulsation introduction means;
7—cleaning piston;
8—recirculation circuit;
9—feeding circuit for the third injector;
$d_1$—elongated injector dimension parallel to the direction of the longitudinal axis of chamber 1;
$d_2$—elongated injector dimension transversal to the direction of the longitudinal axis of chamber 1;
$r_2$—$d_2/2$ The device according to the invention includes, as shown in FIG. 1, a mixing and reaction chamber (1) with opposing injectors (2, 3) located at a distance from the closed end of the chamber approximately equal to half the diameter of the chamber. The mixing and reaction chamber is a tube where one of its ends is closed by a piston (7), as shown in FIG. 2, used for cleaning the chamber and stopping the process. The other end of the tube is opened to the mould (not shown). This invention includes alterations to the commonly used procedures in this type of processes and to the traditional geometries such as the one used in Wingard and Leidal (1978).

The present invention proposes a procedure for the control of the process, through the dynamic pressure measurement upstream of the injectors, using for example a differential pressure transducer (5), as shown in FIG. 1. Since vortice formation with jet oscillations does not occur in stationary flow regime, the dynamic pressure measurement allows the determination of the flow regime within the chamber (1).

It is also proposed the pulsation of the jets through the induction of an oscillating frequency on the jets flowrates. The induction of jets oscillations assures the operation of the reactor at flow regimes associated with high mixing efficiency.

In a preferred embodiment, it is proposed the induction of jets oscillations with frequencies multiple of the natural oscillation frequencies of the jets, which impose the formation of smaller vortices and the reduction of the mixing scales.

Traditional opposing jets reactors present serious operating deficiencies for reactions where the reactants flowrates are very different, as for example, in the case of anionic polymerizations, where the monomer is mixed with an initiator. With the objective of widening the range of application of these reactors, in this invention it is proposed that in the cases where the ratio between the reactants flowrates is greater than 10, the reactant with higher feed flowrate be injected in equal amounts through each of the two opposing injectors (2 and 3) and the reactant with lower feed flowrate be injected through a third injector (4). The third injector should be located within the impact region of the two opposing jets. FIGS. 1 and 2 show a schematic representation of this proposal, where one of the reactants is divided into the two opposing injectors and the other reactant is injected in the point of impact of the two opposing jets.

In the present invention, it is also proposed an alteration to the geometry of chamber (1), that introduces a rectangular prismatic chamber shown in FIG. 4, with two opposing injectors (2, 3) that extend through the whole length of the face of chamber (1), that is, the dimension normal to the longitudinal axis of the chamber. For this geometry, the equalization of the kinetic energy of the opposing jets is done through the ratio between the apertures of the injectors, $d_1$, FIG. 6.

Another embodiment of this invention is proposed in the case of cylindrical chambers, which involves the use of injectors (2, 3) elongated in the direction normal to the mixing chamber axis, as shown in FIG. 5, instead of the traditional circular injectors. Some geometrical configurations for elongated injectors (2, 3) are shown in FIG. 6.

The elongated injectors (2, 3) must be centred and aligned with each other, and have the same characteristic size $d_2$ ($r_2=d_2/2$) in the direction normal to the axis of the mixing chamber, see FIGS. 5 and 6. Then, to equalize the kinetic energy of the jets, it is the size $d_1$ of the injector in the direction of the axis of the chamber (1) that must be changed.

Innovation and Advantages of the Invention

Chaotic flow regimes are associated with strong jets oscillations, with typical frequencies that depend on the geometry of the chamber and the injection flowrate. Jets oscillations induce pressure fluctuations in the injectors, and thus the dynamic pressure measurement upstream of the injectors, and the determination of the frequency of their oscillations may be used to determine the flow regime at which the reactor is operating. The determination of the flow regime allows the adjustment of the process operating conditions, which are the main cause for the occurrence of stationary flow regime in the mixing and reaction chamber (1), even for Reynolds number above critical.

The feeding of the injectors may also be pulsated in order to impose flow oscillations and ensuring the operation of the reactor at high mixing efficiency, that is, in chaotic flow regime. The pulsation of the jets also promotes the elimination of the experimentally observed temporary stationary flow periods.

By using frequencies multiple of the natural oscillation frequency of the jets it is possible to break typical flow structures, reducing the mixing scales and subsequently increasing the mixing homogeneity.

In certain applications, the reactants flowrates are so different that turn useless the usual configurations of this type of mixing devices. An alternative configuration is the injection of the reactants at higher flowrates in a equally distributed fashion between the two opposing jets, enabling a flow regime with very strong mixing dynamics, and within which the lower flowrate reactant can be injected in a third jet. The third injection can be done at the point of impact of the two high flowrate jets, where the flow dynamics is stronger. This process allows a very good flowing homogeneity, resulting into products with a narrow distribution of the sizes of the macromolecules at the end of the process, and thus a very homogeneous final product.

The splitting of one of the reactants between the two opposing injectors, with the perfect balancing conditions in both injectors, ensures the operation of the reactor in chaotic flow regime for Reynolds number above 120. Furthermore, the pressure difference between the injectors is annulled, enabling the elimination of flowrate restrictors and the operation at low pressures.

Prismatic rectangular reaction and mixing chambers with the proposed configuration in this invention present the following advantages, when compared with cylindrical chambers with circular injectors:

For the same injectors based Reynolds number, the proposed prismatic chamber has lower fluid passage time and a faster mould filling. The decrease in both the passage time and the mould filling time promotes a lower degree of polymer conversion during the process, decreasing the viscosity of the mixture. Operation at lower viscosity is advantageous for the filling of the mould;

Injectors spanning the whole width of the mixing chamber face, enables that a larger region of the chamber be used for the opposing jets impact, which is the mechanism that is in the origin of the whole mixing dynamics in this type of reactors (see Teixeira, 2000);

This configuration presents, for the same injector based Reynolds number, higher Reynolds numbers within the mixing chamber, thus expanding the regions of stronger flow dynamics (see Teixeira, 2000 and Santos, 2003);

The non-circular geometry of the injectors enables that, when they are altered for equalization of the opposing jets kinetic energy, the region of impact of the jets remains the same along the whole length of the line $d_2$ of the injector.

In this type of flows, the rotation axis of the vortices is normal to the plane defined by the axis of the mixing chamber and the centre of the injectors. The walls of the rectangular prismatic chamber are normal to the rotation axis of the vortices, disabling the growth of the vortices by vortex stretching. The vortex stretching mechanism is responsible for the dissipation of the vortices, and thus avoiding this mechanism allows that the vortices keep evolving within the chamber towards regions further downstream from the jets impact point. Since the vortices are the main mixing mechanism, the prismatic chamber promotes the increase of the mixing dynamics comparatively to the cylindrical chambers.

The introduction of elongated injectors in cylindrical mixing chambers may present some of the advantages of the prismatic rectangular mixing chambers comparatively to the cylindrical chambers with circular injectors:

Lower passage time values for the same injector based Reynolds number;

Higher percentage of the chamber volume used for the impact region of the jets;

Higher Reynolds numbers within the mixing chamber, for the same injector based Reynolds number.

REFERENCES

Decker, H. W., United States Patent Office, U.S. Pat. No. 5,270,013, 1993.

Kolodziej, P., Macosko, C. W. and Ranz, W. E., Polymer Engineering and Science, 1982, 22, 388-392.

Kolodziej, P., Yang, W. P., Macosko, C. W. and Wellinghoff, S. T., Journal of Polymer Science, 1986, 24, 2359-2377.

Macosko, C. W. and Lee, L. J., United States Patent Office, U.S. Pat. No. 4,189,070, 1978.

Macosko, C. W. and McIntyre, D. B., United States Patent Office, U.S. Pat. No. 4,473,531, 1984.

Nenncker, G. H., United States Patent Office, U.S. Pat. No. 5,498,151, 1996.

Reilly, B. J. and Michels, R., United States Patent Office, U.S. Pat. No. 4,840,556, 1989.

Santos, R. J. Mixing Mechanisms in Reaction Injection Moulding. An LDA/PIV Experimental Study and CFD Simulation. PhD Dissertation, Universidade do Porto, Porto, 2003.

Schulte, K., Krippl, K., Friederichs and Weber, H. U., United States Patent Office, U.S. Pat. No. 6,297,342, 2001.

Teixeira, A. M. Escoamento na Cabeca de Mistura de uma Máquina RIM (Flow in a RIM Machine Mixing Head). Ph.D. Dissertation, Faculdade de Engenharia da Universidade do Porto, Porto, 2000.

Vuillemin, B. and Nowe, M., European Patent Office, EP 0 749 987, 1996.

Vuillemin, B. and Nowe, M., United States Patent Office, U.S. Pat. No. 5,886,112, 1999.

Wallner, J., United States Patent Office, U.S. Pat. No. 4,702,890, 1987.

Wallner, J., United States Patent Office, U.S. Pat. No. 4,773,564, 1988.

Wingard, R. D. and Leidal, S. M., United States Patent Office, U.S. Pat. No. 4,082,512, 1978.

The invention claimed is:

1. Production process for parts by Reaction Injection Moulding, characterized in that it is performed a dynamic pressure measurement, for the determination of a pulsation—both in frequency and in amplitude—to which a mixing and reaction pulsation regime is subjected to, and subsequently is detected a flow regime within the mixing and reaction chamber, wherein the performing the dynamic pressure measurement includes measuring the frequency of a pressure signal obtained from the dynamic pressure measurement, such that the frequency is a function of mixing dynamics.

2. Process according to claim 1, characterized in that the dynamic pressure measure is made upstream of the injectors.

3. Process according to claim 2, characterized in that the dynamic pressure measure is made using a differential pressure transducer, with pressure taps located upstream of the injectors.

4. Process according to any of claims 1 to 3, characterized in that a pulsation is artificially introduced in the jets of the injectors and, in the jets it is performed a measurement of the pulsation resulting from the combination of the artificially introduced pulsation and the natural pulsation resulting directly from the mixing and reaction regime.

5. Process according to claim 4, characterized in that the artificially introduced pulsation is automatically adjusted, in frequency and/or in amplitude, as a function of the dynamic pressure measurement.

* * * * *